US012673781B2

(12) United States Patent
Marleau-Finley et al.

(10) Patent No.: US 12,673,781 B2
(45) Date of Patent: Jul. 7, 2026

(54) EXTERNALLY-MOUNTED AIRCRAFT ENGINE COMPONENT

(71) Applicant: PRATT & WHITNEY CANADA CORP., Longueuil (CA)

(72) Inventors: Julien Marleau-Finley, Montreal (CA); Marion Daniel, Verdun (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 175 days.

(21) Appl. No.: 18/298,481

(22) Filed: Apr. 11, 2023

(65) Prior Publication Data

US 2024/0343405 A1 Oct. 17, 2024

(51) Int. Cl.
B64D 33/00 (2006.01)
F02C 7/06 (2006.01)
F16N 19/00 (2006.01)

(52) U.S. Cl.
CPC ............... B64D 33/00 (2013.01); F02C 7/06 (2013.01); F16N 19/00 (2013.01)

(58) Field of Classification Search
CPC ............ B64D 33/00; F02C 7/06; F16N 19/00
USPC ......................................................... 220/562
See application file for complete search history.

(56) References Cited

U.S. PATENT DOCUMENTS 3,251,500 A * 5/1966 Archbold .................. F17C 1/16
220/62.19
4,207,033 A * 6/1980 Drutchas ............. F04C 15/0042
417/455

5,458,101 A * 10/1995 Crooks .................. F01M 13/00
123/196 S
6,290,086 B1 * 9/2001 Franklin, III .......... F17C 3/025
244/135 R
8,636,162 B2 * 1/2014 Schoen ................ B60K 15/067
220/563

(Continued)

FOREIGN PATENT DOCUMENTS

CA        2982036 A1      4/2018
CA        3152682 A1      9/2022

(Continued)

OTHER PUBLICATIONS

European Search report issued in counterpart EP application No. 24169771.3 on Sep. 3, 2024.

*Primary Examiner* — Orlando E Aviles
*Assistant Examiner* — Niki M Eloshway
(74) *Attorney, Agent, or Firm* — NORTON ROSE FULBRIGHT CANADA LLP

(57) ABSTRACT

A component for an aircraft engine. The component is mountable externally to a core of the aircraft engine. The component includes an enclosure having a wall circumscribing a sealed inner chamber. The wall has an inner surface and an outer surface. The wall has a first wall portion welded to a second wall portion along a weld line extending about a perimeter of the enclosure. A mounting bracket is disposed on the outer surface for mounting the component to the core. A protrusion protrudes from one or more of the outer surface and the inner surface and extends along one or more of the outer surface and the inner surface concentrically with the weld line. Sn additional protrusion protrudes from one or more of the outer surface and the inner surface. The additional protrusion extends from the protrusion to the mounting bracket.

8 Claims, 5 Drawing Sheets

(56)     References Cited

U.S. PATENT DOCUMENTS

| | | | | |
|---|---|---|---|---|
| 10,717,489 | B2 * | 7/2020 | Tabuchi | B62J 35/00 |
| 10,807,669 | B2 * | 10/2020 | Tabuchi | B62J 35/00 |
| 2007/0017918 | A1 * | 1/2007 | Kirk | B60K 15/035 |
| | | | | 220/563 |
| 2021/0332948 | A1 | 10/2021 | McBride et al. | |
| 2022/0072949 | A1 | 3/2022 | Ley et al. | |
| 2022/0290615 | A1 * | 9/2022 | Weaver | F02C 7/36 |

FOREIGN PATENT DOCUMENTS

| | | | |
|---|---|---|---|
| EP | 0043299 | B1 | 9/1984 |
| EP | 2801512 | A1 | 11/2014 |

* cited by examiner

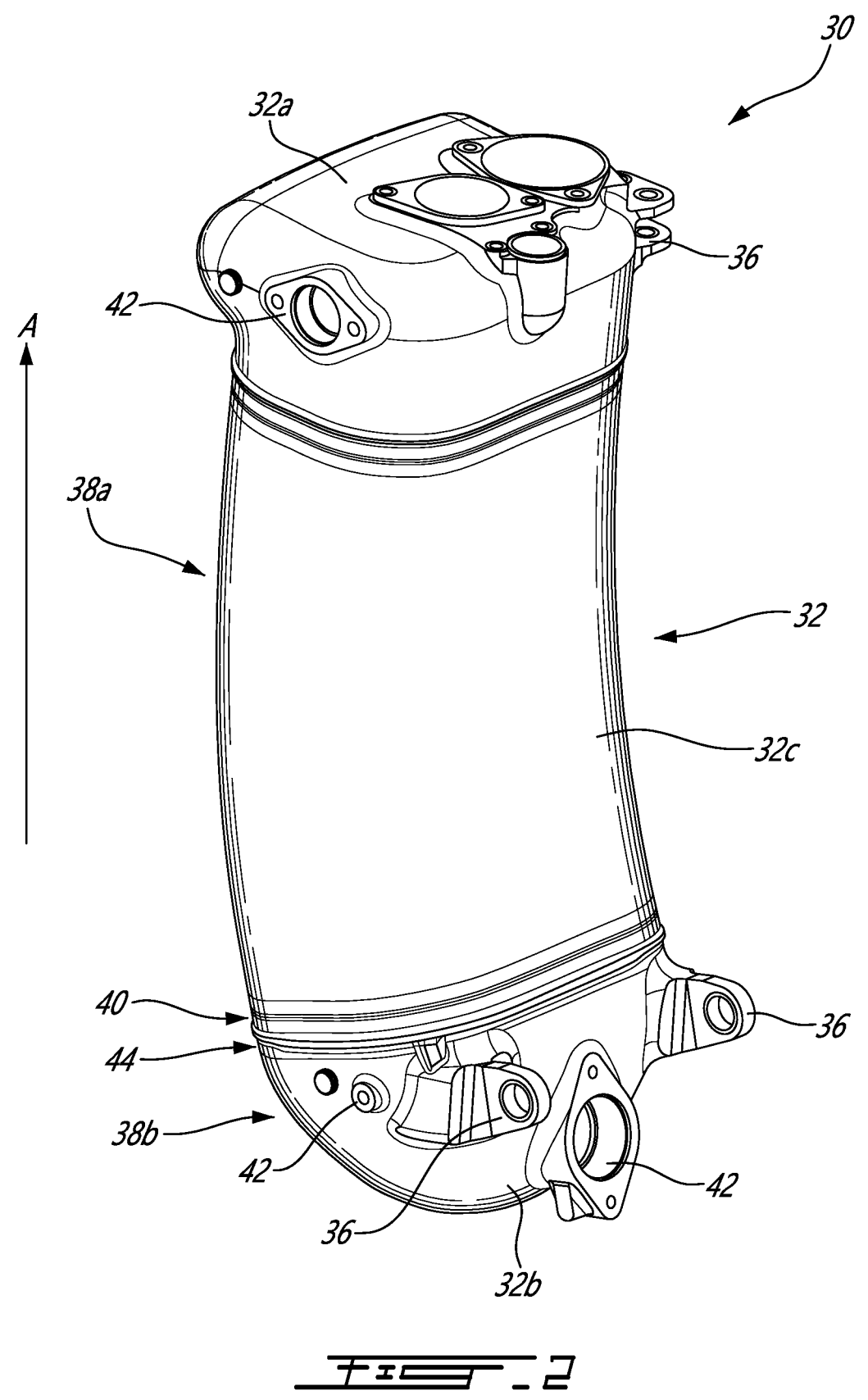
_FIG. 2_

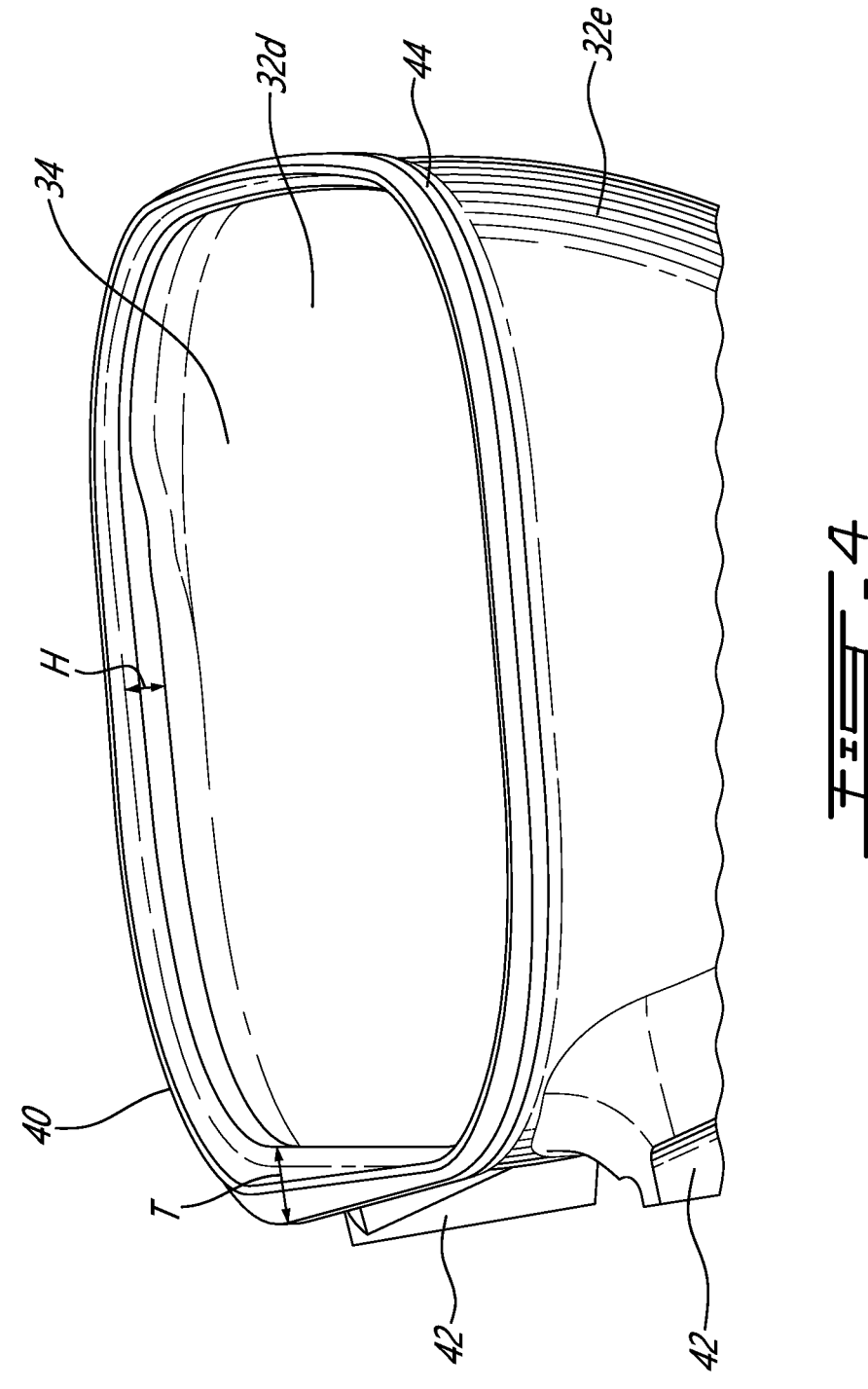
_Fig. 4_

EXTERNALLY-MOUNTED AIRCRAFT ENGINE COMPONENT

TECHNICAL FIELD

The disclosure relates generally to aircraft engines, and, more particularly, to externally-mounted components for aircraft engines.

BACKGROUND

Externally-mounted engine components for gas turbine engines, such as oil tanks or other pressurized vessels, may be subjected to various stresses under engine operation. In some cases, the component may be made from casting, or from casted and sheet metal portions welded together. These weld locations, as well as the locations of the component's mount, may be locations of high static and dynamic stresses.

SUMMARY

In one aspect, there is provided a component for an aircraft engine, the component mountable externally to a core of the aircraft engine, the component comprising: an enclosure having a wall circumscribing a sealed inner chamber, the wall having an inner surface and an outer surface, the wall having a first wall portion welded to a second wall portion along a weld line extending about a perimeter of the enclosure; a mounting bracket disposed on the outer surface for mounting the component to the core; a protrusion protruding from one or more of the outer surface and the inner surface and extending along one or more of the outer surface and the inner surface concentrically with the weld line; and an additional protrusion protruding from one or more of the outer surface and the inner surface, the additional protrusion extending from the protrusion to the mounting bracket.

In another aspect, there is provided an aircraft engine, comprising: a casing; an oil tank mounted externally to the casing, the oil tank having: an enclosure having a wall defining a sealed inner chamber, the wall having an inner surface and an outer surface; a mounting bracket disposed on the outer surface and coupling the oil tank to the casing; and a protrusion protruding from one or more of the outer surface and the inner surface and extending about a perimeter of the enclosure.

In a further aspect, there is provided a method of manufacturing an externally-mountable component for an aircraft engine, comprising: forming a first portion of the component having a first wall portion defining a first inner chamber; forming a second portion of the component having a second wall portion defining a second inner chamber; forming a protrusion extending about an outer perimeter of the second wall portion; forming a mounting bracket on the second wall portion; and welding the first portion of the component to the second portion of the component at edges of the first wall portion and the second wall portion to form a sealed enclosure.

BRIEF DESCRIPTION OF THE DRAWINGS

Reference is now made to the accompanying figures in which:

FIG. 2 is a perspective view of an externally-mounted component for the engine of FIG. 1;

FIG. 4 is an enhanced perspective view of a portion of the externally mounted component of FIG. 2.

DETAILED DESCRIPTION

Figure 1:
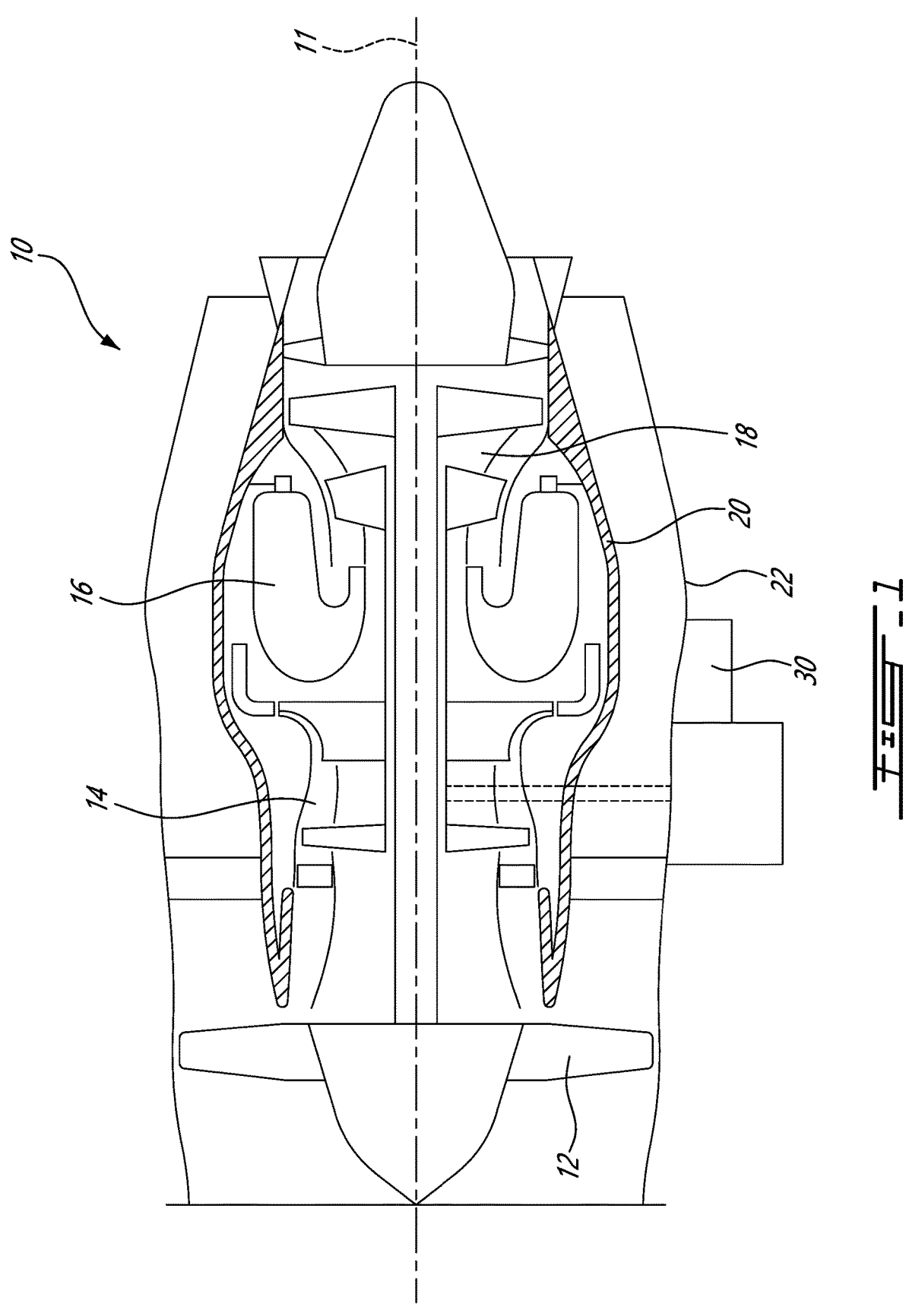
FIG. 1 is a schematic cross sectional view of a gas turbine engine.

FIG. 1 illustrates a gas turbine engine 10 of a type preferably provided for use in subsonic flight, generally comprising in serial flow communication, along central longitudinal axis 11 (also referred to as the engine's rotation axis 11), a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. While FIG. 1 depicts engine 10 as a turbofan-type gas turbine engine, the present disclosure may relate to other types of aircraft engines, such as turboprop engines, turboshaft engines, as well as hybrid-electric engines.

The gas turbine engine 10 includes a first, inner casing 20 which encloses the turbo machinery of the engine, and a second, outer casing 22 extending outwardly of the first casing 20 such as to define an annular bypass passage therebetween, also referred to as a bypass duct or an annular outer passage. The air propelled by the fan 12 is split into a first portion which flows around the first casing 20 within the bypass passage, and a second portion which flows through a main gas path, also referred to as a core passage, which is defined within the first casing 20 and allows the gas flow to circulate through the multistage compressor 14, combustor 16 and turbine section 18 as described above.

Figure 3:
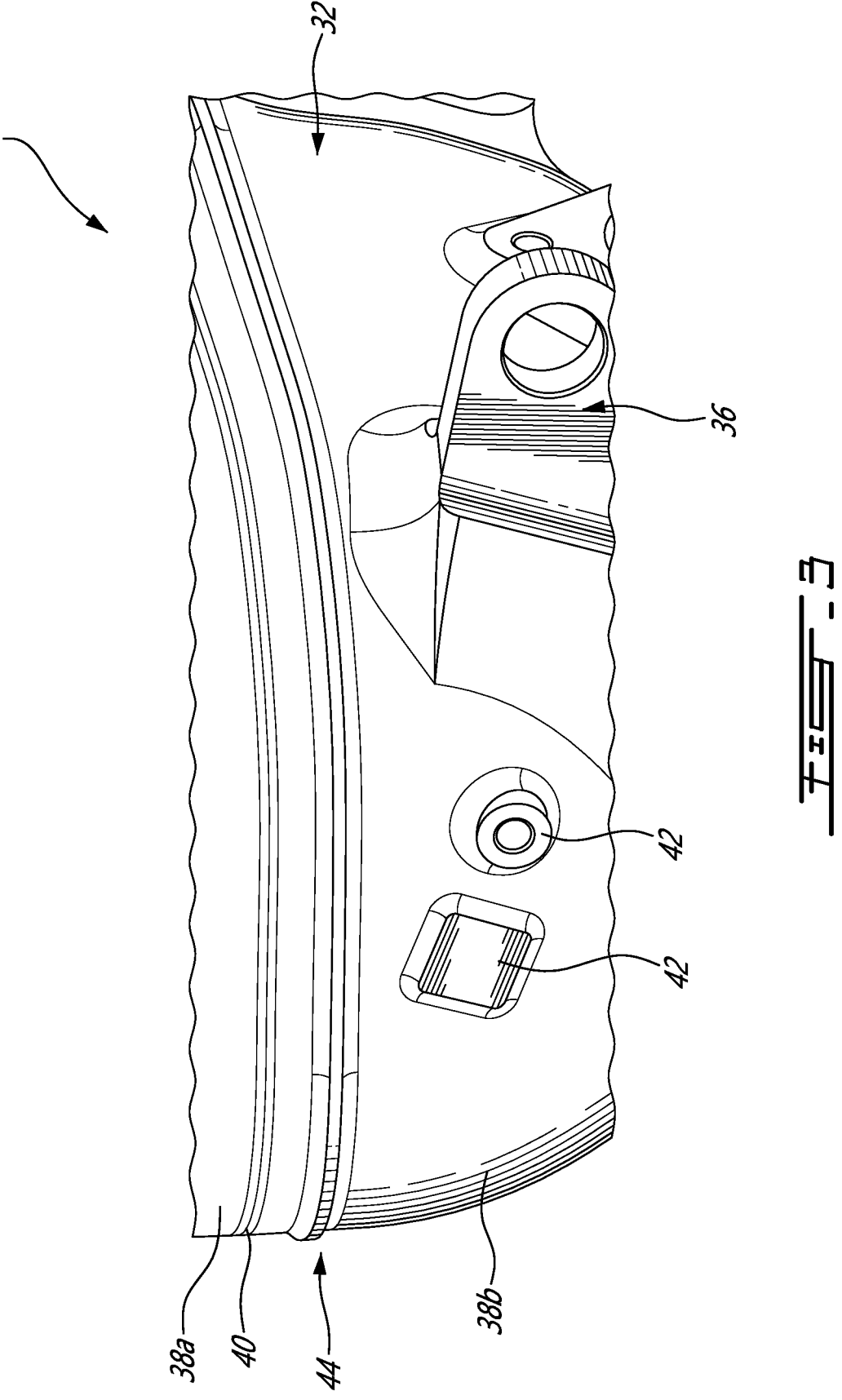
FIG. 3 is an enhanced perspective view of the externally mounted component of FIG. 2.

Referring to FIGS. 2-4, an externally-mounted component 30 for the engine 10 is shown. The component 30 may be, for instance, an externally-mounted oil tank containing engine oil for the engine 10. In other cases, the component 30 may be another externally-mounted engine component or accessory, such as another pressurized vessel (e.g., a filter housing, pump casting, or heat exchanger for the engine 10). Other components 30 may be contemplated as well. The depicted component 30 has a wall 32 that forms an enclosure to define a sealed inner chamber 34. In the shown case, the wall 32 has a top 32a, a bottom 32b and sides 32c enclosing the sealed inner chamber 34 relative a component axis A extending generally along a length of the component 30, illustratively from the bottom 32b to the top 32a of the component 30. In some cases, the component axis A may be parallel to the engine longitudinal axis 11 when the component is installed on the engine 10. Other directions or orientations for axis A may be contemplated. The wall 32 includes an inner surface 32d (see FIG. 4) exposed to the contents of the sealed inner chamber 34 (e.g., oil) and an outer surface 32e. Various shapes and sizes for the component may be contemplated. The component 30 is externally mountable to the core of engine 10, for instance to the outer casing 22, via one or more mounting brackets 36 (also referred to as mounts) disposed on the outer surface 32e. In the depicted embodiment, the component 30 includes two mounting brackets 36 towards a lower portion of the component 30 and one mounting bracket 36 towards an upper portion of the component 30, although other numbers and locations for the mounting brackets 36 may be contemplated.

In the shown embodiment, but not necessarily the case in all embodiments, the component 30 is formed of two wall portions or shells: a first or upper wall portion/shell 38*a* and a second or lower wall portion/shell 38*b*. The upper wall portion 38*a* and lower wall portion 38*b* may be operatively coupled to one another to form the enclosed component 30, for instance via welding along a weld line 40. The weld line 40 is disposed at a lower edge of the upper portion 38*a* and at an upper edge of the lower portion 38*b* and extends about a perimeter of the enclosure, i.e., along the outer surface 32*e*. Other joining techniques for the upper portion 38*a* and the lower portion 38*b* may be contemplated. In some cases, the upper portion 38*a* may be formed of cast metal, and the lower portion 38*b* may be formed of sheet metal. The opposite arrangement, as well as various combinations of the above arrangement, may be contemplated. In other cases, the component 30 may be formed of a single, unitary material, for instance cast metal.

The component 30 may be a relatively large and heavy component, for instance due to the contents stored within. Its placement, especially when remote to the engine's rotation axis 11, can make it prone to various effects, such as high static stresses, high cycle fatigue, as well as other typical structural considerations. In addition, the pressurized contents stored within the component 30 may contribute to additional stresses thereon. Various motivations may exist for mounting such a relatively large and heavy component 30 externally to the outer casing 22, remotely from the engine's rotation axis 11, such as seeking an environment which is cooler than the engine core, for instance, or connection convenience with another component. However, various stresses may adversely affect the component 30 and lead to early failure, for instance at locations adjacent the one or more mounting brackets 36, adjacent to and concentric with the weld line 40, or adjacent other transition surfaces 42 (i.e., non-smooth surfaces such as inlets, outlets, and other protrusions) along the outer surface 32*e* which are more susceptible to various loads and stresses.

In the depicted embodiment, the component 30 includes a protrusion 44 protruding from the outer surface 32*e* and/or the inner surface 32*d* of the component 30 and extending about a perimeter (for instance, a circumference) of the outer surface 32*e* and/or the inner surface 32*d*, forming a lip around the outer surface 32*e* and/or the inner surface 32*d*. The protrusion 44, also referred to as webbing or a stiffener, may be operable to increase stiffness of the component 30, thereby compensating for the various stresses that the component 30 is subjected to. In some cases, the protrusion 44 extends circumferentially relative to or along a closed perimeter around the component axis A. Other directions may be contemplated as well. The protrusion 44 may be disposed along the outer surface 32*e* and/or the inner surface 32*d* adjacent features susceptible to increased stresses, for instance the mounting bracket(s) 36, the weld line 40, and/or other transition surfaces 42. An increased width of the protrusion relative to the adjacent outer wall 32 may provide the protrusion's 44 with increased stiffness at predetermined positions, as will be discussed in further detail below. In addition, the location of the protrusion 44 along the outer surface 32*e* and/or the inner surface 32*d*, for instance the axial position of the protrusion 44 relative to the component axis A, may be selected based on where the increased stiffness would be most beneficial. For instance, in the embodiment shown in FIGS. 2-4, the protrusion 44 is disposed on the lower wall portion 38*b* axially between the weld line 40 and the mounting brackets 36 relative to the component axis A. Other positions for the protrusion 44 may be contemplated.

With reference to FIG. 4, a width of the protrusion 44 may vary in one or more directions, i.e., in height H (in a direction parallel to the component axis A) and thickness T (in a direction normal to the component axis A), along the perimeter of the protrusion 44 around the outer surface 32*e* and/or the inner surface 32*d*. For instance, the height H and/or thickness T may be greater along the perimeter of the protrusion 44 at circumferential positions adjacent features of the component 30 susceptible to increased stresses, for instance the mounting bracket(s) 36 or other transition surfaces 42. By reserving these increases of width for locations where additional stiffness may be required, the weight increase of the component 30 due to the addition of the protrusion 44 may be minimized, as the width of the protrusion 44 may be reduced at locations where the component 30 is subjected to lesser stresses. In other cases, the protrusion 44 may have a constant width (i.e., height H and thickness T) along its entire perimeter, for instance to provide additional stiffness to an entire perimeter of the component 30. A cross-sectional shape of the protrusion 44 may vary, for instance to account for the changes in height H and thickness T and the stress requirements of the component 30.

The width of the protrusion 44, i.e., the height H and thickness T, may vary along the perimeter of the protrusion 44. For instance, the height H may increase and decrease in directions along with and/or opposite from the axis A along the perimeter of the protrusion 44. Similarly, the thickness T may increase and decrease both inwardly and/or outwardly in a direction normal to the axis A along the perimeter of the protrusion 44. Such increases and decreases of the height H and thickness T may, for instance, provide additional stiffness at specific locations on the component 30. For instance, in cases where the lower wall portion 38*b* is formed of thin sheet metal, the protrusion 44 may provide additional stiffness to this portion that may otherwise be lacking stiffness and be susceptible to stresses. Additionally or alternatively, such increases and decreases of the height H and thickness T, and the directions of such increases and decreases, may accommodate design and structural requirements of the component 30. For instance, such variations may ensure sufficient volume for the contents (e.g., oil) stored within, or to avoid interference with the various transition surfaces 42 on the outer surface 32*e* thereof and ensure sufficient clearance with adjacent components. As increases in height H and thickness T may both provide additional stiffness to the component 30, various combinations in such increases may be contemplated. In other cases, one parameter (e.g., the height H or the thickness T) may vary along the perimeter of the component 30 while the other parameter (e.g., the thickness T or the height H) may remain constant along the perimeter of the component 30.

Figure 5:
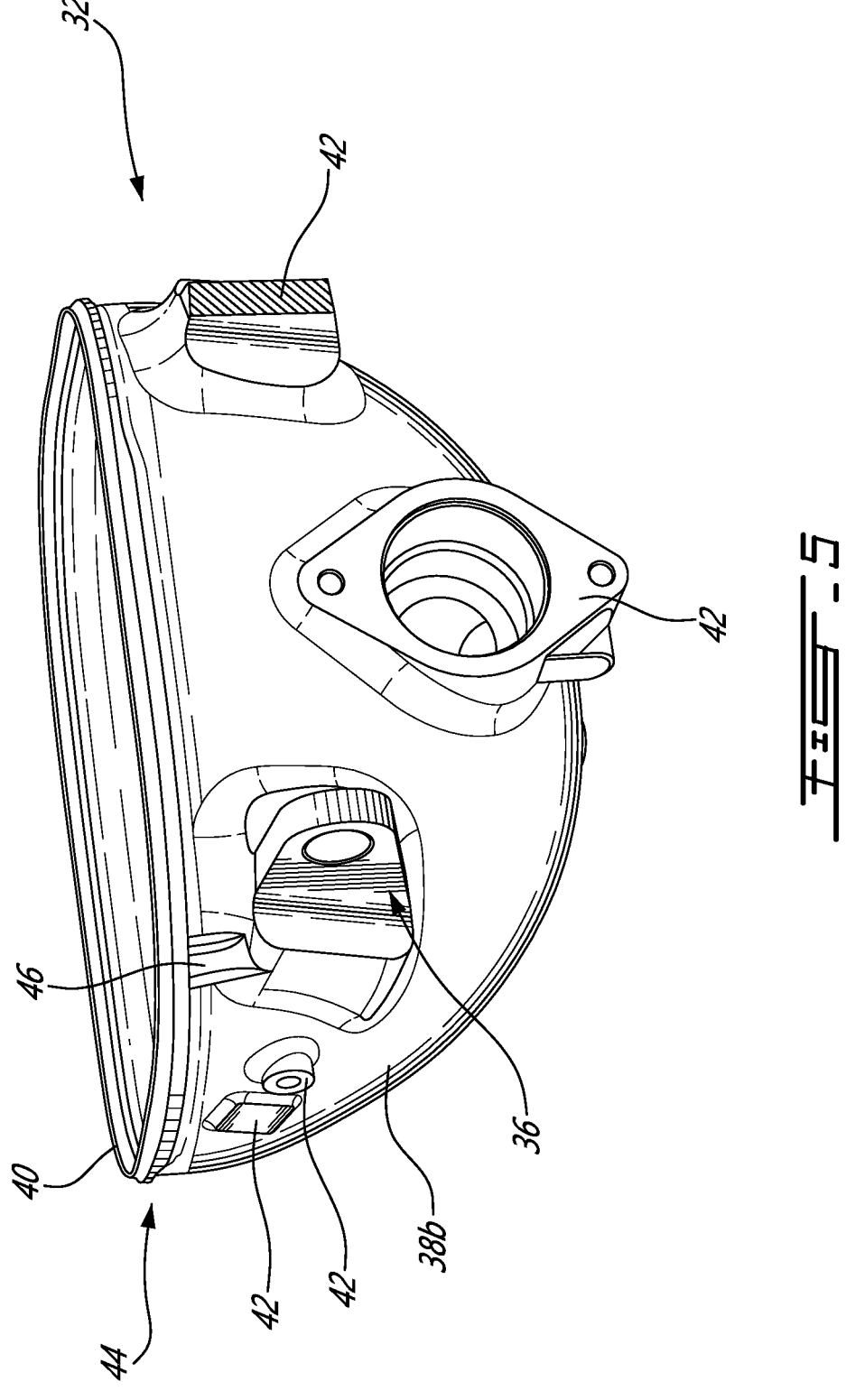
FIG. 5 is an enhanced perspective view of another externally mounted component for the engine of FIG. 1.

Referring to FIG. 5, the component may additionally include an additional protrusion 46 protruding from the outer surface 32*e* and/or from the inner surface 32*d*. The additional protrusion 46, also referred to as an additional stiffener or rib, extends between the protrusion 44 and a feature of component 30 susceptible to increased stresses, such as a mounting bracket 36, to provide additional stiffness thereto. In other cases, the additional protrusion 46 may extend between the protrusion 44 and another transition surface 42. The dimensions and shape of the additional protrusion 46 may vary. For instance, a height of the additional protrusion 46 relative to the outer surface 32*e* and/or a thickness along the outer surface 32*e* may vary, for instance based on stiffness requirements. Additionally or alternatively, a length of the additional protrusion 46 along the outer surface 32*e* and/or the inner surface 32*d* may vary, for instance based on the distance between the protrusion 44 and the mounting bracket 36 (or other transition surface 42). A cross-sectional shape of the additional protrusion 46 may vary, for instance to account for various stress distributions. An outer perimeter of the cross-sectional shape of the additional protrusion 46 may, for instance, have a curved profile. Other shapes may be contemplated. In various cases, a direction of the additional protrusion 46 along the outer surface 32*e* and/or the inner surface 32*d* may be aligned with a direction of stresses which the component 30 is subjected to (i.e., the stresses to be minimized).

In accordance with the present disclosure, there is taught an exemplary method of manufacturing an externally-mountable component 30 for an aircraft engine. A first portion of the component 30 having a first wall portion (for instance, upper wall portion 38*a*) is formed, defining a first inner chamber. A second portion of the component 30 having a second wall portion (for instance, lower wall portion 38*b*) is formed, defining a second inner chamber. A protrusion 44 is formed, extending about an outer perimeter of the second wall portion. A mounting bracket 36 is formed on the second wall portion. The first portion of the component 30 is operatively coupled to the second portion of the component 30 at edges of the first wall portion and the second wall portion to form a sealed enclosure. In some embodiments, an additional protrusion 46 is formed on the second wall portion, the additional protrusion 46 extending between the protrusion 44 and the mounting bracket 36.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A component for an aircraft engine, the component mountable externally to a core of the aircraft engine, the component comprising:
   an enclosure having a wall circumscribing a sealed inner chamber, the wall having an inner surface and an outer surface, the wall having a first wall portion welded to a second wall portion along a weld line extending about a perimeter of the enclosure;
   a mounting bracket disposed on the outer surface for mounting the component to the core;
   a protrusion protruding outwardly from the outer surface and inwardly from the inner surface and extending along the outer surface and the inner surface concentrically with the weld line about the perimeter of the enclosure; and
   an additional protrusion protruding from one or more of the outer surface and the inner surface, the additional protrusion extending along the one or more of the outer surface and the inner surface between a first additional protrusion end at the protrusion and a second additional protrusion end at the mounting bracket;
   wherein the additional protrusion has a curved cross-sectional profile at a junction with the one or more of the outer surface and the inner surface.

2. The component of claim 1, wherein the protrusion has a width that varies along the perimeter of the enclosure.

3. The component of claim 2, wherein the width of the protrusion varies in two directions along the perimeter of the enclosure.

4. The component of claim 1, wherein the protrusion is disposed adjacent to the weld line.

5. The component of claim 4, wherein the protrusion is disposed axially between the weld line and the mounting bracket relative to an axis extending along a length of the component.

6. The component of claim 1, wherein the first wall portion is formed of cast metal and the second wall portion is formed of sheet metal.

7. The component of claim 1, wherein the protrusion has a width that is constant along the perimeter of the enclosure.

8. The component of claim 1, wherein the component is an oil tank, and wherein the additional protrusion extends along a direction aligned with a direction of stresses which the oil tank is subjected.

* * * * *